United States Patent
Achten et al.

(10) Patent No.: US 10,241,003 B2
(45) Date of Patent: Mar. 26, 2019

(54) METHOD OF MEASURING TIME DELAYS WITH RESPECT TO DIFFERENTIAL MODE DELAY (DMD) OF A MULTI-MODE FIBER (MMF) OR A FEW-MODE FIBER (FMF)

(71) Applicant: Draka Comteq B.V., Amsterdam (NL)

(72) Inventors: Franciscus Johannes Achten, Amsterdam (NL); Denis Molin, Draveil (FR); Nam Nguyen Thang, Amsterdam (NL)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 15/408,746

(22) Filed: Jan. 18, 2017

(65) Prior Publication Data
US 2017/0205311 A1   Jul. 20, 2017

(30) Foreign Application Priority Data
Jan. 18, 2016   (NL) ..................... 2016112

(51) Int. Cl.
*G01M 11/00* (2006.01)
*G01M 11/08* (2006.01)
*H04B 10/077* (2013.01)

(52) U.S. Cl.
CPC ........ *G01M 11/338* (2013.01); *G01M 11/088* (2013.01); *G01M 11/332* (2013.01); *G01M 11/335* (2013.01); *H04B 10/0775* (2013.01)

(58) Field of Classification Search
None
See application file for complete search history.

(56) References Cited

U.S. PATENT DOCUMENTS

| | | | |
|---|---|---|---|
| 7,639,249 B2 | 12/2009 | Kihslinger | |
| 7,773,844 B2 * | 8/2010 | Bagheri | G02B 6/262 385/27 |
| 2002/0176071 A1 * | 11/2002 | Fontaine | G01J 11/00 356/73.1 |
| 2002/0186437 A1 * | 12/2002 | Sasaoka | G01M 11/333 398/158 |
| 2009/0297140 A1 * | 12/2009 | Heismann | G01M 11/333 398/16 |
| 2014/0098361 A1 * | 4/2014 | Fini | G01M 11/331 356/73.1 |
| 2014/0368809 A1 * | 12/2014 | Chen | G01M 11/335 356/51 |

FOREIGN PATENT DOCUMENTS

EP    1705471 A1    9/2006
WO   00/62033 A    10/2000

OTHER PUBLICATIONS

Search Report in counterpart Dutch Application No. 2016112 dated Sep. 7, 2016, pp. 1-7.

* cited by examiner

*Primary Examiner* — Shawn Decenzo
(74) *Attorney, Agent, or Firm* — Additon, Higgins & Pendleton, P.A.

(57) ABSTRACT

The invention relates to a method of measuring time delays with respect to differential mode delay of a multi-mode fiber or a few-mode fiber for at least two different wavelengths. The time delays for each wavelength are measured before the single mode fiber is translated to a next radial offset.

20 Claims, 2 Drawing Sheets

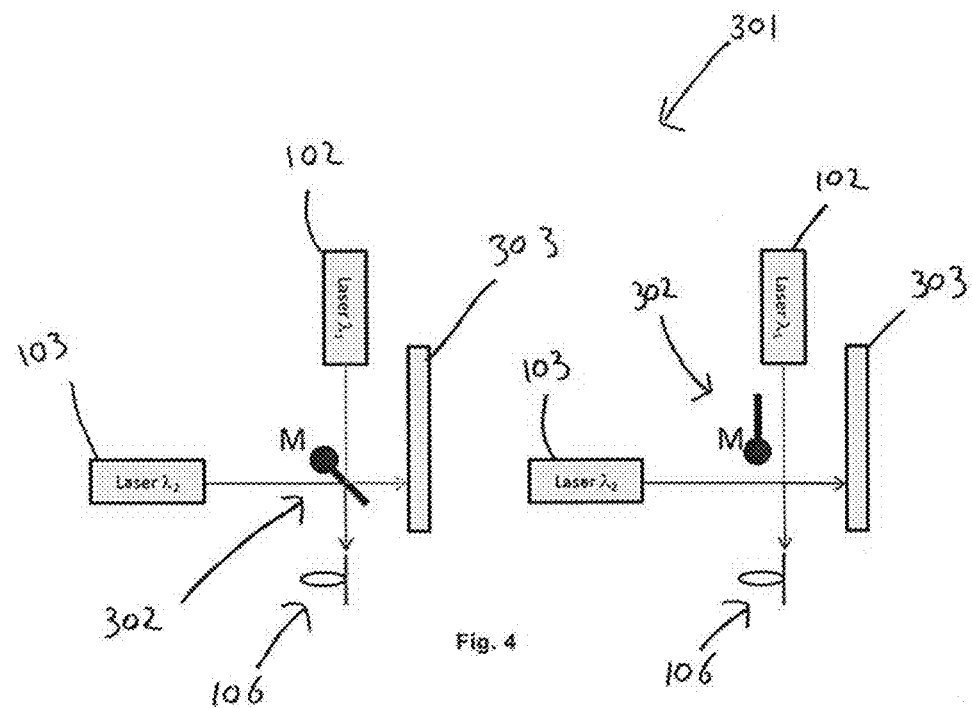
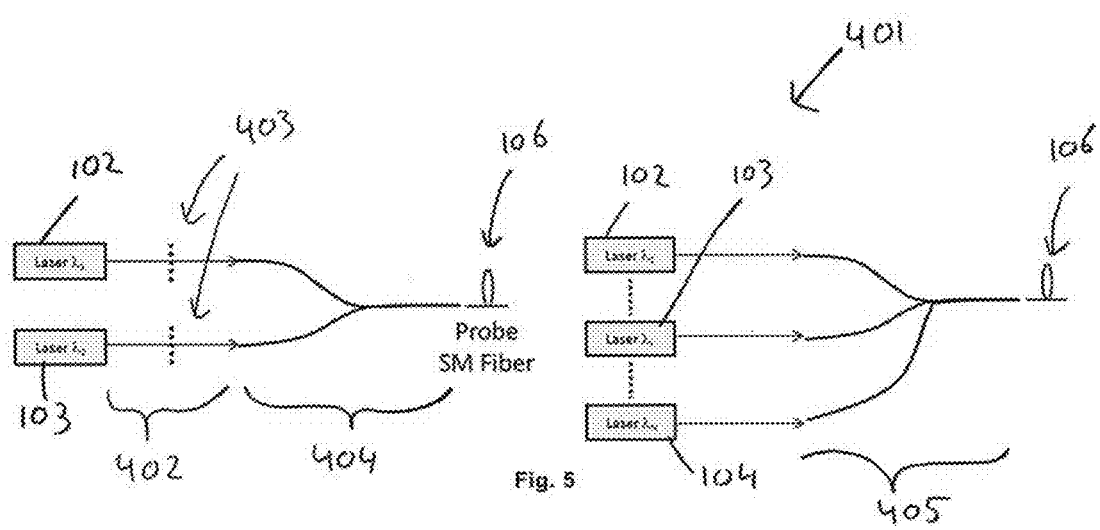

METHOD OF MEASURING TIME DELAYS WITH RESPECT TO DIFFERENTIAL MODE DELAY (DMD) OF A MULTI-MODE FIBER (MMF) OR A FEW-MODE FIBER (FMF)

CROSS-REFERENCE TO PRIORITY APPLICATION

This application claims the benefit of pending Dutch Application No. 2016112 (filed Jan. 18, 2016, at the Dutch Patent Office), which is hereby incorporated by reference in its entirety.

FIELD OF THE INVENTION

The present invention relates to the field of optical fiber transmissions and, more specifically, to multi-mode fibers, MMFs, and/or few-mode fibers, FMFs. An exemplary method according to the present invention embraces a method of measuring time delays with respect to Differential Mode Delay, DMD, of a multi-mode fiber, MMF, or a few-mode fiber, FMF, for at least two different wavelengths in a measurement arrangement.

BACKGROUND

A wide-band multi-mode fiber, like the OM4 multi-mode fiber, is understood to be a multi-mode fiber having an exemplary wavelength range between 850 nanometers and 950 nanometers.

Multi-mode fibers are successfully used in high-speed data networks together with high-speed sources that typically use transversely multimode vertical cavity surface emitting lasers, more simply called VCSELs. However, multi-mode fibers are affected by intermodal dispersion, which results from the fact that, for a particular wavelength, several optical modes propagate simultaneously along the fiber, carrying the same information, but travelling with different propagation velocities. Modal dispersion is expressed in term of Differential Mode Delay, DMD, which is a measure of the difference in pulse delay between the fastest and slowest modes traversing the multi-mode fiber.

In order to minimize modal dispersion, the multi-mode optical fibers used in data communications generally include a core having a refractive index that decreases progressively going from the center of the fiber to its interface with a cladding (e.g., a typical multi-mode fiber has a graded-index profile).

When a light signal propagates in such a core having a graded index, the different modes experience a different propagation medium, which affects their speed of propagation differently. It is theoretically possible to obtain a group velocity that is virtually equal for all the modes and thus a reduced intermodal dispersion for a particular wavelength.

Enabled by VCSEL technology, high-speed multi-mode optical fibers, such as OM4 fibers (which are laser-optimized, high bandwidth 50 μm multi-mode fibers, standardized by the International Standardization Organization in Publication IEC 60793-2-10:2015 (Edition 5), published Nov. 19, 2015, fiber type Ala.3), have proved to be the medium of choice for high-data-rate communications, delivering reliable and cost-effective 10 to 100 Gbps solutions. The combination of Wide-Band (WB) multi-mode fibers with longer wavelengths VCSELs for Coarse Wavelength Division Multiplexing (CWDM) may be an interesting option to be considered in order to meet the future increase of demand. Publication IEC 60793-2-10:2015 is hereby incorporated by reference in its entirety.

However, the modal bandwidth of, for example, OM4 fibers has until now been achieved only over a narrow wavelength range, typically 850 nanometers+/−10 nanometers. The feasibility of Wide-Band, WB, multi-mode fibers satisfying OM4 performance requirements over a broader wavelength range is a challenge to overcome for next generation multi-mode systems.

Multi-mode fiber performance is typically defined by an assessment of Effective Modal Bandwidth, EMB, at a given wavelength. For example, OM4 fibers should exhibit EMB greater than 4,700 MHZ-km at a wavelength of 850 nm+/−1 nanometers. The achievement of such high EMB values requires extremely accurate control of refractive index profile of multi-mode fibers. Until now, traditional manufacturing processes cannot guarantee such high EMB, and it is difficult to accurately predict the EMB values from refractive index profile measurements on core rod or cane. This is especially so when high EMB values, typically larger than 2,000 MHz-km, are expected, meaning the optical fiber's refractive index profile is close to the optimal profile. As a matter of fact, EMBs are directly assessed on the fibers.

A few-mode fiber is typically defined by Differential Mode Group Delays, DMGDs. The DMGDs are measured using a DMD technique, mostly at a wavelength of 1550 nanometers. Other wavelengths might also be of future interest once few-mode fibers, FMFs, are used in wide band applications as well.

The Effective Modal Bandwidth, EMB, is assessed by a measurement of the delay due to the modal dispersion, known under the acronym DMD for "Differential Mode Delay." It includes recording pulse responses of the multi-mode fiber, or the few-mode fiber, for single-mode launches that radially scan the core. It provides a DMD plot that is then post-processed in order to assess the minimal EMB a fiber can deliver. The DMD measurement procedure has been the subject of standardization and is specified by the International Standardization Organization in Publication IEC 60793-1-49:2006 (Edition 2), published Jun. 26, 2006, which is hereby incorporated by reference in its entirety. The DMD metric, also called DMD value, is expressed in units of picoseconds per meter (ps/m). It assesses the delay between the fastest and the slowest pulses considering a collection of offset launches normalized by fiber length. It basically assesses a modal dispersion. Lower DMD value (i.e., lower modal dispersion as measured by DMD) generally results in higher EMB.

The DMD measurement procedure includes measuring the fiber response when a pulse, or a pulse train, is launched with a fiber that is single mode at the wavelength of interest. The excited modes in the multi-mode fiber or the few-mode fiber, (i.e., the fiber under test, FUT) depend on the lateral position of the single mode fiber with respect to the FUT optical axis. Basically, centered launch excites the lowest order modes while offset launches excite the highest order modes. Therefore, a collection of records of fiber response when the single mode fiber scans the core of the FUT gives a good overview of the modal dispersion of the FUT. It is noted that DMD measurements typically require an alignment procedure to allow correct centered launch (i.e., when the single mode probe fiber axis is aligned with the FUT optical axis).

A known measurement arrangement includes a laser that is arranged to emit a train of laser pulses of a few picoseconds up to hundreds of picoseconds at a single wavelength. The laser pulse is coupled into a single mode fiber via a first component comprising, for example, mirrors and/or optics. The single mode fiber is coupled to the FUT via a second component, which comprises a translation stage allowing a lateral translation of the single-mode fiber with respect to the FUT fiber optical axis. The output of the FUT is coupled into a detector module, via a third component. The detector module is arranged to convert the optical waveform into an electrical waveform. The detector module is further arranged to sample the received electrical waveform and to allow signal recording. Until recently, DMD measurements were performed at a single wavelength.

Nowadays, wavelength division multiplexing, WDM, is expected to be used in data communication systems in order to extend the multi-mode fiber capacity. For instance, four channels at 10 Gbps or 40 Gbps spaced within the 850-950 nanometer range are going to be used to deliver 100 Gbps or 400 Gbps through a single multi-mode fiber. As a consequence, DMD measurements over the whole 850-950 nanometer range are necessary to assess the modal dispersion of multi-mode fibers.

In addition, single mode fibers are likely to be replaced by few-mode fibers in regular optical communications in order to enlarge the fiber capacity through spatial mode multiplexing. The modal dispersion of the few-mode fibers is also relevant, and so the need for accurate DMD measurements at several wavelength is increasing rapidly.

U.S. Patent Publication No. 2014/0368809, which is hereby incorporated by reference in its entirety, discloses a differential mode delay measurement system for an optical fiber. The system includes an optical test fiber with a plurality of modes, a single mode light source that provides a continuous light wave signal to a modulator, and a pulse generator that provides an electrical pulse train signal to the modulator and a triggering signal to a receiver. The modulator is configured to generate a modulated optical test signal through the optical fiber based at least in part on the received light wave and pulse train signals, and the receiver is configured to receive the test signal transmitted through the fiber and evaluate the test signal based at least in part on the triggering signal.

European Patent Publication No. 1,705,471 and its counterpart U.S. Pat. No. 7,369,249, each of which is hereby incorporated by reference in its entirety, disclose an apparatus for measuring the differential mode delay of multi-mode optical fibers. The apparatus includes a tunable laser source, an interferometer, a data-collecting device, and a computer. The tunable laser source outputs light, frequencies of which vary linearly. The interferometer generates multi-mode light and single mode light by separating light, which is output from the tunable laser source, transmitting the multi-mode light and the single mode light to the multi-mode optical fiber, which is a measurement target, and a single mode path, which is a reference, and generating a beating signal by causing the multi-mode light and the single mode light to interfere with each other.

SUMMARY

In a first aspect, the invention provides in a method of measuring time delays with respect to Differential Mode Delay, DMD, of a multi-mode fiber, MMF, or a few-mode fiber, FMF, for at least two different wavelengths in a measurement arrangement, said measurement arrangement comprising a laser device arranged to emit laser pulses at said at least two different wavelengths, a single mode fiber, SMF, arranged to couple emitted laser pulses into said MMF or said FMF, a first component arranged to couple laser pulses emitted by said laser device into said SMF, a second component arranged to align said SMF to said MMF or said FMF, a detector module arranged for detecting emitted laser pulses exiting said MMF or said FMF, and a third component arranged to couple said emitted laser pulses exiting said MMF or said FMF to said detector module, said method comprising the subsequent steps a), b), c):

a) providing said MMF or said FMF in said measurement arrangement, and aligning, by said second component, said SMF to said MMF or said FMF;

b) performing first measurements with respect to a first radial offset value, by:

positioning, by said second component, said SMF to said MMF or said FMF at said first radial offset value;

emitting, by said laser device, said laser pulses at said at least two different wavelengths;

measuring, by said detector module, said time delays of said emitted laser pulses exiting said MMF or said FMF individually for each of said at least two different wavelengths;

c) performing second measurements with respect to a further radial offset value, by:

positioning, by said second component, said SMF to said MMF or said FMF at said further radial offset value, said further radial offset being different from a previous radial offset value;

emitting, by said laser device, said laser pulses at said at least two different wavelengths;

measuring, by said detector module, said time delays of said emitted laser pulses exiting said MMF or said FMF individually for each of said at least two different wavelengths.

Without being bound to any theory, it was the insight of the inventors that laser pulses at said at least two different wavelengths should be emitted by the laser device and the time delays of said emitted laser pulses exiting said MMF or said FMF should be measured, by the detector module, individually for each of said at least two different wavelengths before the second component positions the SMF to said MMF or said FMF at a further radial offset value.

This implies that the time delays for each wavelength are measured at substantially the same radial offset, as the second component will only position the SMF to the MMF or the FMF once the time delays for all wavelengths have been performed.

The inventors noted that the modes coupled to the MMF or FMF are sensitive to the exact radial offset position (i.e., alignment of the SMF to the MMF or the FMF). This is especially true at radial offset positions approximately halfway between the center of the core and the cladding. Positioning (i.e., "locking") the radial offset position while changing wavelengths will avoid positional differences due to, for example, hysteresis effects of the second component. "Locking" the offset position will therefore increase measurement reliability significantly with respect to wavelength dependency. Advantageously, measurement reliability is increased significantly with respect to wavelength-dependent DMD.

In accordance with the present invention, the detector module may be arranged to determine the relative delays of the received laser pulses using some sort of pulse location technique (e.g., peak amplitude, center of gravity, percentage of maximum power on leading or trailing edge, etc.). The measured time delays then form the basis for determining the wavelength dependent modal dispersion of the SMF or the FMF.

The steps of positioning, by said second component, said SMF to said MMF or said FMF at a particular radial offset value entails that the optical axis of the SMF is offset to the optical axis of the MMF or the FMF at the particular radial offset value. This means that the emitted laser pulses enter the MMF or the FMF with a radial offset with respect to the center core thereof.

An alignment procedure is initiated first by the second component, such that the optical axis of the SMF coincides with the optical axis of the MMF or the FMF, before performing the method steps b) and c) according to the present invention.

Using the method according to the present invention, the wavelength dependency with respect to differential mode delay in a MMF or a FMF can be determined accurately.

The main difference between a MMF and a SMF is that the MMF has much larger core diameter, typically 50-100 micrometers, which is typically larger than the wavelength, or wavelengths, of the laser pulses carried in it. The emitted laser pulses are coupled into the MMF at different radial offsets in order to accurately determine the wavelength dependency with respect to the differential mode delay of the MMF. As such, initially, the radial offset may be substantially equal to zero such that the optical axis of the SMF is in line (i.e., aligned) with the optical axis of the MMF. The radial offset may then gradually increased, with steps of, for example, between 0.5 micrometer and 10 micrometers, typically between 1 and 5 micrometers, and more typically between 1 and 2 micrometers, to the outside of the MMF's core. An important aspect of the present invention is that all wavelength measurements are performed before the radial offset is gradually increased with the next step.

In an embodiment, the steps of emitting comprise individually and subsequently emitting, by said laser device, said laser pulses at said at least two different wavelengths.

In this embodiment, the laser device first emits a laser pulse at a first wavelength. The time delays with respect to this emitted laser pulse at the first wavelength are measured by the detector module. Subsequently, the laser device emits a laser pulse at a second wavelength. The time delays with respect to this emitted laser pulse at the second wavelength are then measured by the detector module. This process repeats itself until time delays related to laser pulses with all intended wavelengths have been emitted, and measured.

In an alternative embodiment, the steps of emitting may comprise emitting, by said laser device, said laser pulses at said at least two different wavelengths simultaneously.

Here, the third component, or the first component, may include filtering means arranged for selectively passing one of said at least two different wavelengths and for filtering out a remainder of said at least two different wavelengths. Accordingly, the steps of measuring comprise measuring, by said detector module, said time delays of said emitted laser pulses exiting said MMF or said FMF individually for each of said at least two different wavelengths by using said filtering means.

In this case, the filtering means would be tuned initially to a first wavelength. That is, the filtering means will filter out all wavelengths except that first wavelength, and so only the laser pulses with the first wavelength will arrive at the detector module. The detector module then measures any time delays of said emitted laser pulses exiting said MMF or said FMF. The filtering means are then tuned to a second wavelength, and the process repeats itself, etc. (e.g., via sequential, tuned filtering).

The detector module may also include a plurality of detectors, wherein said third component is arranged to demultiplex said laser pulses such that each of said at least two different wavelengths is coupled to a different detector. This implies that the laser pulse at the input of the third component is demultiplexed into a plurality of different detectors. That is, each wavelength is sent to a different detector.

As an alternative, the detector module may include a plurality of detectors, each of which is wavelength sensitive at a single wavelength. The third component is then arranged to couple said emitted laser pulses exiting said MMF or said FMF to each of said plurality of detectors.

Here, the third component acts like a splitter, such that the incoming laser pulses are split and sent to each of the plurality of detectors. Each of the detectors are wavelength sensitive at a particular, different wavelength, such that the time delays of said emitted laser pulses exiting said MMF or said FMF can be measured individually for each of said at least two different wavelengths.

According to the present invention, the third component, or the first component, may include any kinds of filtering means, such as optical filters and beam splitters. Additional filtering means may include Bragg gratings (e.g., tunable Bragg gratings using photo-refractive material, such as liquid crystal), acousto-optic tunable filters, dynamic gain-grating holograms, switchable optical bandpass filters, and interference filters. An optical filter is, for example, a device that selectively transmits light of different wavelengths, usually implemented in the optical path as plane glass or plastic devices, either dyed in the bulk or having interference coatings. Optical filters are described by their frequency response, which specifies how the magnitude and phase of each frequency component of an incoming signal is modified by the filter.

According to the present invention, the first component may comprise any of rotating mirrors, choppers, optical fiber splitters, and photonic lanterns. A chopper is, for example, a device that periodically interrupts a light beam (i.e., the laser pulse). Three kinds of choppers are presently available on the market: variable frequency rotating disc choppers, fixed frequency tuning fork choppers, and optical shutters.

In a second aspect, the invention includes a non-transitory computer-readable carrier medium storing a computer program product that includes program code instructions for implementing the present methods for measuring time delays whenever said program is executed on a computer or a processor.

In a third aspect, the invention provides in a measurement arrangement for measuring time delays with respect to Differential Mode Delay, DMD, of a multi-mode fiber, MMF, or a few-mode fiber, FMF, for at least two different wavelengths, said measurement arrangement comprising:

a laser device arranged to emit laser pulses at said at least two different wavelengths, a single mode fiber, SMF, arranged to couple emitted laser pulses into said MMF or said FMF, a first component arranged to couple laser pulses emitted by said laser device into said SMF, a second component arranged to align said SMF to said MMF or said FMF, a detector module arranged for detecting emitted laser pulses exiting said MMF or FMF, a third component arranged to couple said emitted laser pulses exiting said MMF or said FMF to said detector module, and a control device arranged for controlling the subsequent steps b) and c):

b) performing first measurements with respect to a first radial offset value, by:

positioning, by said second component, said SMF to said MMF or said FMF at said first radial offset value;

emitting, by said laser device, said laser pulses at said at least two different wavelengths;

measuring, by said detector module, said time delays of said emitted laser pulses exiting said MMF or said FMF individually for each of said at least two different wavelengths;

c) performing second measurements with respect to a further radial offset value, by:

positioning, by said second component, said SMF to said MMF or said FMF at said further radial offset value, said further radial offset being different from a previous radial offset value;

emitting, by said laser device, said laser pulses at said at least two different wavelengths;

measuring, by said detector module, said time delays of said emitted laser pulses exiting said MMF or said FMF individually for each of said at least two different wavelengths.

The control device may be a computer comprising a processor arranged to facilitate the subsequent steps b) and c) according to the present invention.

The above-mentioned and other features and advantages of the invention will be best understood from the following description referring to the attached drawings. In the drawings, like reference numerals denote identical parts or parts performing an identical or comparable function or operation.

The invention is not limited to the particular examples disclosed below or a particular method for measuring time delays with respect to Differential Mode Delay, DMD, of a multi-mode fiber, MMF, or a few-mode fiber, FMF, for at least two different wavelengths.

The present invention does not require significant changes to the measurement arrangement that are already in use. Therefore, the solution to the problem presented in the present invention is simple and cost-effective to implement.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 4 discloses an example of a first component used in a measurement arrangement in accordance with the present invention.

FIG. 5 discloses another example of a first component used in a measurement arrangement in accordance with the present invention.

DETAILED DESCRIPTION

An aspect of the present invention is to provide for a method of accurately measuring time delays with respect to Differential Mode Delay, DMD, of a multi-mode fiber, MMF, or a few-mode fiber, FMF, for at least two different wavelengths in a measurement arrangement. For example, the exemplary method may be applied to OM2, OM3 and OM4 multi-mode fibers.

Figure 1:
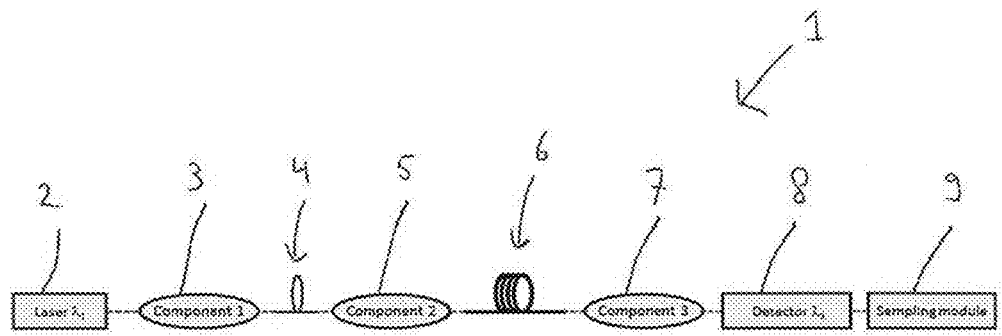
FIG. 1 discloses a measurement arrangement in accordance with the prior art.

FIG. 1 discloses a measurement arrangement 1 in accordance with the prior art. Typically, a laser device 2, which could be a solid-state laser or a fiber laser, is arranged to emit laser pulses of a few picoseconds up to hundreds of picoseconds at a single wavelength. An emitted laser pulse is coupled into a single mode fiber, SMF, 4. The coupling is made by a first component 3 in free space using mirrors.

The single mode fiber is coupled to the fiber under test, namely a multi-mode fiber 6. The coupling between the SMF 4 and the fiber under test 6 is made by a second component 5. The second component 5 allows for core scanning of the multi-mode fiber, MMF, 6 by the SMF 4. The second component 5 can be a butt coupling controlled by a translation stage, which allows a lateral translation of the SMF 4 with respect to the optical axis of the MMF 6.

The output of the MMF 6 is coupled into a detector module 8, which can convert the optical waveform into an electrical waveform. The electrical waveform is then sent into a sampling module 9 in order to sample the received waveform train and to allow signal recording. The coupling between the MMF 6 and the detector module 8 is made by the third component 7.

Figure 2:
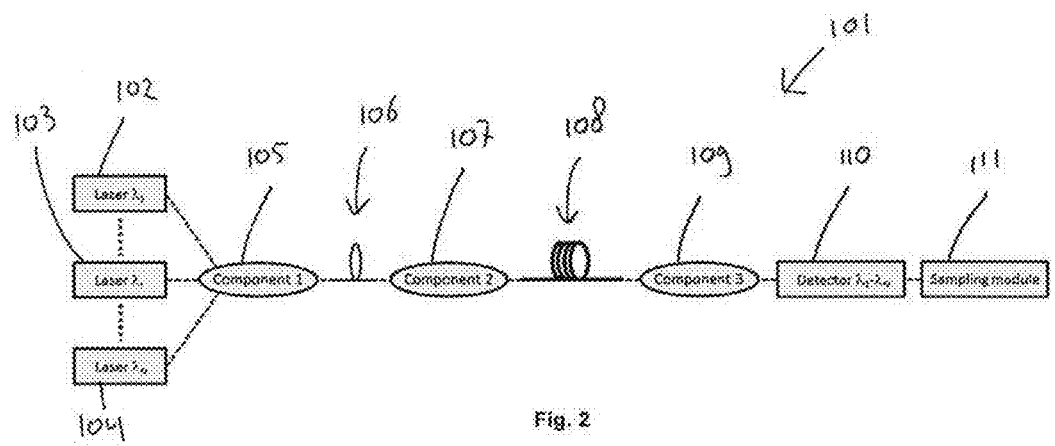
FIG. 2 discloses an exemplary measurement arrangement in accordance with the present invention.

FIG. 2 discloses an exemplary measurement arrangement 101 in accordance with the present invention. The measurement arrangement 101 is suitable for measuring time delays with respect to differential mode delay of a multi-mode fiber, MMF, or a few-mode fiber, FMF, for at least two different wavelengths. As such, using this measurement arrangement 101, the wavelength dependency with respect to the differential mode delay of a MMF or a FMF can be determined accurately.

In the present example depicted in FIG. 2, the laser device comprises a plurality of lasers (i.e., a first laser 102, a second laser 103, and up to an Nth laser 104), each of which is arranged to emit laser pulses at a different wavelength. The method of measuring time delays with respect to Differential Mode Delay, DMD, is not limited to a particular number of lasers. As an alternative, a single tunable laser may be used to emit laser pulses sequentially at multiple wavelengths.

In a first step, a MMF 108 or a FMF 108 is provided in the measurement arrangement 101, and the SMF 106 is aligned to the MMF 108 or the FMF 108, by the second component 107. Subsequently, a first set of measurements are performed with respect to a first radial offset value.

The second component 107 positions the SMF 106 to the MMF 108 or the FMF 108, or vice versa, at a first radial offset value. For example, the optical axis of the SMF 106 is positioned with a particular radial offset with respect to the optical axis of the MMF 108 or the FMF 108. Subsequently, a first laser pulse is emitted by the first laser 102, and the first laser pulse is coupled into the SMF 106 by the first component 105. The emitted first laser pulse is then coupled to the MMF 108 or the FMF 108 using the second component 107. The first laser pulse exiting the MMF 108 or the FMF 108 is then coupled, using the third component 109, into a detector 110. The detector 110 and the sampling module 111 together form a detector module, which is arranged to measure the time delays of any emitted laser pulse that exits the MMF 108 or the FMF 108.

Once this process is completed, a second laser pulse having a second wavelength is emitted by a second laser 103. The time delays related to this second laser pulse having the second wavelength, which is different from the first wavelength, are measured in a same way as described for the laser pulse having the first wavelength. This process repeats itself until laser pulses with all intended wavelengths have been emitted, and the time delays of all of these laser pulses have been measured.

Only then are second measurements performed with respect to a further radial offset value, by positioning via the second component 107 the SMF 106 to the MMF 108 or the FMF 108 at the further radial offset value. The further radial offset is different from any previous radial offset value. The laser devices 102, 103, 104 each emit laser pulses at different wavelengths, and the detector module measures the time delays of the emitted laser pulses exiting the MMF 108 or the FMF 108 individually for each of the wavelengths.

A notable aspect of the present invention is that the time delays of the laser pulses are measured for each of the wavelengths before the second component 107 positions the SMF 106 to the MMF 108 or the FMF 108 at a further radial offset.

One advantage of the exemplary method of measuring time delays is that measurement reliability is increased significantly when investigating wavelength dependent differential mode delay, because all intended wavelengths are measured at the same radial offset. That is, the coupling between the SMF 106 and the MMF 108 or the FMF 108 does not change between wavelengths.

Another advantage of the exemplary method of measuring time delays is that the costs of the receiver side do not increase with the number of wavelengths. For example, only one detector module can measure each of the intended laser pulses.

Yet another advantage is that the preparation time for the SMF 106 or the FMF 108 (or the MMF 108) does not increase with the number of wavelengths. The preparation of the SMF 106 or the FMF 108 (or the MMF 108) needs to be performed only once.

Figure 3:
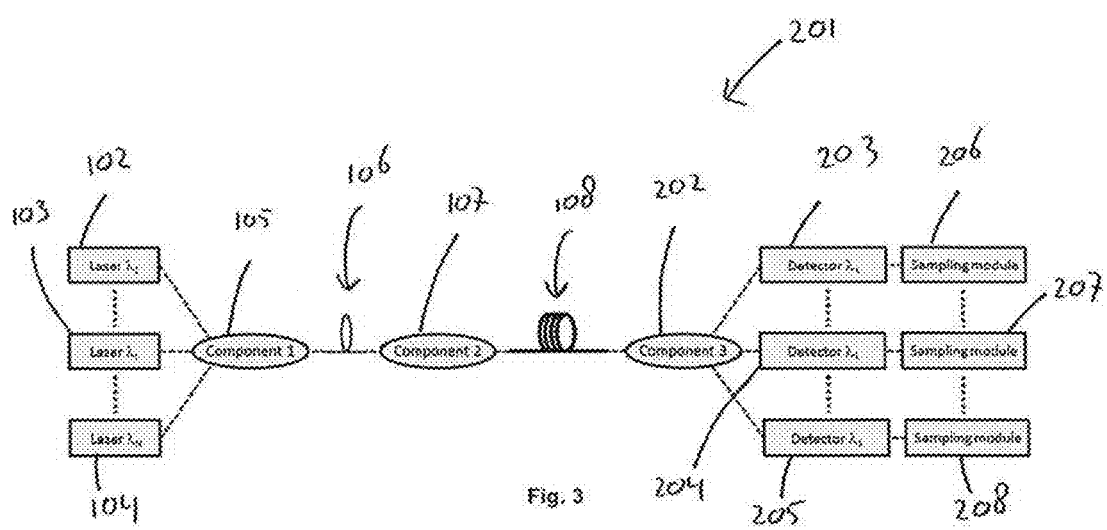
FIG. 3 discloses another exemplary measurement arrangement in accordance with the present invention.

FIG. 3 discloses another exemplary measurement arrangement 201 in accordance with the present invention. The main difference between the measurement arrangement 201 shown in FIG. 3 and the measurement arrangement 101 shown in FIG. 2 is that the laser pulses exiting the laser devices 102, 103, 104 are each coupled, by the first component 105, to the SMF 106 simultaneously. In contrast, the first component 105 in the measurement arrangement 101 shown in FIG. 2 is arranged to couple only one of the emitted laser pulses to the SMF 106 at a time.

The third component 202 of the measurement arrangement 201 shown in FIG. 3 acts like a wavelength demultiplexer. That is, the third component 202 can split the received laser pulses by wavelength and can send each of the pulses by wavelength to a different detector 203, 204, 205. Each detector is itself coupled to a respective sampling module 206, 207, 208. The result is that a laser pulse at a first wavelength is sent to the first detector 203, a laser pulse at a second wavelength is sent to the second detector 204, and a laser pulse at an Nth wavelength (e.g., a third wavelength) is sent to the Nth detector 205 (e.g., a third detector), etc.

One advantage of this exemplary method of measuring time delays is that all measurements are efficiently performed in parallel. Accordingly, the measurement time for multiple wavelength is substantially equal to the measurement time for a single wavelength.

As an alternative, the detector module may comprise a plurality of detectors, each being wavelength sensitive to a particular wavelength (e.g., a single wavelength). The third component 202 is arranged to couple the emitted laser pulses exiting the MMF 108 or the FMF 108 to each of the plurality of detectors. For example, the third component may split and then direct the laser pulses to the plurality of detectors. Here, all the detectors receive all the emitted laser pulses exiting the MMF 108 or the FMF 108, but each detector is configured to measure a specific wavelength.

FIG. 4 discloses an exemplary first component 301 used in a measurement arrangement in accordance with the present invention. Here, the first component 301 comprises a rotating mirror 302 to select the wavelength to be coupled into the SMF 106. In a first position, shown at the left side of FIG. 4, the rotating mirror 302 reflects (i.e., couples) the laser pulses emitted from the second laser 103 into the SMF 106. The laser pulses emitted by the first laser device 102 are reflected, by the rotating mirror 302, into an absorber 303. In a second position, shown at the right side of FIG. 4, the rotating mirror 302 is rotated such that it does not influence any of the emitted laser pulses of the first laser 102 and the second laser 103. As such, the laser pulses emitted by the first laser 102 are directly coupled into the SMF 106, and the laser pulses emitted by the second laser 103 are absorbed by the absorber 303. Using the rotating mirror 302, only one laser pulse can be coupled to the SMF 106 at a time.

FIG. 5 discloses another exemplary first component 401 used in a measurement arrangement in accordance with the present invention. A fiber coupler 404, as shown at the left side of FIG. 5, can be used to couple laser pulses emitted by the first laser device 102 and the second laser device 103 into the SMF 106. Optionally, choppers 403 can be provided, for example in free space 402, to filter out one or more of the wavelengths and to pass all the other wavelengths. A photonic lantern 405, as shown at the right side of FIG. 5, can also be used to couple all emitted wavelengths from each of the laser devices 102, 103, 104 into the SMF 106.

The present invention is not limited to the examples as disclosed above, and can be modified and enhanced by those skilled in the art beyond the scope of the present invention as disclosed in the appended claims without having to apply inventive skills.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method of measuring time delays with respect to Differential Mode Delay, DMD, of a multi-mode fiber, MMF, or a few-mode fiber, FMF, for at least two different wavelengths in a measurement arrangement, said measurement arrangement comprising a laser device arranged to emit laser pulses at said at least two different wavelengths, a single mode fiber, SMF, arranged to couple emitted laser pulses into said MMF or said FMF, a first component arranged to couple laser pulses emitted by said laser device into said SMF, a second component arranged to align said SMF to said MMF or said FMF, a detector module arranged for detecting emitted laser pulses exiting said MMF or said FMF, and a third component arranged to couple said emitted laser pulses exiting said MMF or said FMF to said detector module, said method comprising sequential steps a), b), c):
   a) providing said MMF or said FMF in said measurement arrangement and aligning, by said second component, said SMF to said MMF or said FMF;
   b) performing first measurements with respect to a first radial offset value, by:

positioning, by said second component, said SMF to said MMF or said FMF at said first radial offset value;

emitting, by said laser device, said laser pulses at said at least two different wavelengths;

measuring, by said detector module, said time delays of said emitted laser pulses exiting said MMF or said FMF individually for each of said at least two different wavelengths;

c) performing second measurements with respect to a further radial offset value, by:

positioning, by said second component, said SMF to said MMF or said FMF at said further radial offset value, said further radial offset being different from a previous radial offset value;

emitting, by said laser device, said laser pulses at said at least two different wavelengths;

measuring, by said detector module, said time delays of said emitted laser pulses exiting said MMF or said FMF individually for each of said at least two different wavelengths.

2. The method of measuring time delays according to claim 1, wherein said steps of emitting comprise:

individually and sequentially emitting, by said laser device, said laser pulses at said at least two different wavelengths.

3. The method of measuring time delays according to claim 1, wherein said steps of emitting comprise:

emitting, by said laser device, said laser pulses at said at least two different wavelengths simultaneously.

4. The method of measuring time delays according to claim 3, wherein said third component comprises filtering means arranged for selectively passing one of said at least two different wavelengths and for filtering out a remainder of said at least two different wavelengths;

wherein said steps of measuring comprise:

measuring, by said detector module, said time delays of said emitted laser pulses exiting said MMF or said FMF individually for each of said at least two different wavelengths by using said filtering means.

5. The method of measuring time delays according to claim 3, wherein said first component comprises filtering means arranged for selectively passing one of said at least two different wavelengths and for filtering out a remainder of said at least two different wavelengths;

wherein said steps of measuring comprise:

measuring, by said detector module, said time delays of said emitted laser pulses exiting said MMF or said FMF individually for each of said at least two different wavelengths by using said filtering means.

6. The method of measuring time delays according to claim 3, wherein said detector module comprises a plurality of detectors, wherein said third component is arranged to demultiplex said laser pulses such that each of said at least two different wavelengths is coupled to a different detector.

7. The method of measuring time delays according to claim 3, wherein said detector module comprises a plurality of detectors, each of which is wavelength sensitive at a single wavelength, wherein said third component is arranged to couple said emitted laser pulses exiting said MMF or said FMF to each of said plurality of detectors.

8. The method of measuring time delays according to claim 1, wherein said third component comprises optical filters and/or beam splitters.

9. The method of measuring time delays according to claim 1, wherein said first component comprises a rotating mirror, a chopper, an optical fiber splitter, and/or a photonic lantern.

10. The method of measuring time delays according to claim 1, wherein said step of providing said MMF or said FMF in said measurement arrangement comprises:

providing an OM2, OM3, or OM4 multi-mode fiber in said measurement arrangement.

11. A non-transitory computer-readable carrier medium storing a computer program product that comprises program code instructions for implementing the method according to claim 1 whenever said program is executed on a computer or a processor.

12. A method of measuring time delays for at least two different wavelengths via Differential Mode Delay, comprising sequential steps a), b), and c):

a) coupling a single mode fiber, SMF, to either a multi-mode fiber, MMF, or a few-mode fiber, FMF;

b) performing first time delay measurements by:

positioning the SMF to the MMF or the FMF at a first radial offset value;

simultaneously emitting laser pulses at two or more different wavelengths through the SMF and into either the MMF or the FMF; and measuring time delays of the laser pulses exiting either the MMF or the FMF for each of the two or more different wavelengths;

c) performing second time delay measurements by:

positioning the SMF to the MMF or the FMF at a second radial offset value that differs from the first radial offset value;

simultaneously emitting laser pulses at two or more different wavelengths through the SMF and into either the MMF or the FMF; and measuring time delays of the laser pulses exiting either the MMF or the FMF for each of the two or more different wavelengths.

13. The method of measuring time delays according to claim 12, comprising:

filtering the two or more different wavelengths to selectively pass one of the two or more different wavelengths to a detector module; and measuring by the detector module the time delays of the laser pulses exiting either the MMF or the FMF for the wavelength that selectively passes to the detector module.

14. The method of measuring time delays according to claim 13, wherein each of the two or more different wavelengths is sequentially and selectively passed to the detector module for measuring the time delays of the corresponding laser pulses exiting either the MMF or the FMF.

15. The method of measuring time delays according to claim 12, comprising:

demultiplexing the laser pulses exiting either the MMF or the FMF; and coupling each wavelength to a different detector to measure wavelength-dependent time delays.

16. The method of measuring time delays according to claim 12, wherein the steps of measuring time delays of the laser pulses exiting either the MMF or the FMF for each of the two or more different wavelengths comprise (i) directing the laser pulses exiting either the MMF or the FMF to a plurality of detectors and (ii) measuring time delays for each of the two or more different wavelengths respectively by a different detector configured to measure a specific wavelength.

17. A measurement arrangement for measuring time delays with respect to Differential Mode Delay, DMD, of a multi-mode fiber, MMF, or a few-mode fiber, FMF, for at least two different wavelengths, said measurement arrangement comprising:
- a laser device arranged to emit laser pulses at said at least two different wavelengths,
- a single mode fiber, SMF, arranged to couple emitted laser pulses into said MMF or said FMF,
- a first component arranged to couple laser pulses emitted by said laser device into said SMF,
- a second component arranged to align said SMF to said MMF or said FMF,
- a detector module arranged for detecting emitted laser pulses exiting said MMF or FMF,
- a third component arranged to couple said emitted laser pulses exiting said MMF or said FMF to said detector module, and
- a control device arranged for controlling sequential steps b) and c):
- b) performing first measurements with respect to a first radial offset value, by:
- positioning, by said second component, said SMF to said MMF or said FMF at said first radial offset value;
- emitting, by said laser device, said laser pulses at said at least two different wavelengths;
- measuring, by said detector module, said time delays of said emitted laser pulses exiting said MMF or said FMF individually for each of said at least two different wavelengths;
- c) performing second measurements with respect to a further radial offset value, by:
- positioning, by said second component, said SMF to said MMF or said FMF at said further radial offset value, said further radial offset being different from a previous radial offset value;
- emitting, by said laser device, said laser pulses at said at least two different wavelengths;
- measuring, by said detector module, said time delays of said emitted laser pulses exiting said MMF or said FMF individually for each of said at least two different wavelengths.

18. A method of measuring time delays for at least two different wavelengths via Differential Mode Delay, comprising sequential steps a), b), and c):
  a) coupling a single mode fiber, SMF, to either a multi-mode fiber, MMF, or a few-mode fiber, FMF;
  b) performing first time delay measurements by:
  positioning the SMF to the MMF or the FMF at a first radial offset value;
  emitting laser pulses at two or more different wavelengths through the SMF and into either the MMF or the FMF; and
  measuring time delays of the laser pulses exiting either the MMF or the FMF for each of the two or more different wavelengths;
  c) performing second time delay measurements by:
  positioning the SMF to the MMF or the FMF at a second radial offset value that differs from the first radial offset value;
  emitting laser pulses at two or more different wavelengths through the SMF and into either the MMF or the FMF; and
  measuring time delays of the laser pulses exiting either the MMF or the FMF for each of the two or more different wavelengths.

19. The method of measuring time delays according to claim 18, comprising:
  filtering the two or more different wavelengths to selectively pass one of the two or more different wavelengths to a detector module; and
  measuring by the detector module the time delays of the laser pulses exiting either the MMF or the FMF for the wavelength that selectively passes to the detector module.

20. The method of measuring time delays according to claim 18, comprising:
  demultiplexing the laser pulses exiting either the MMF or the FMF; and
  coupling each wavelength to a different detector to measure wavelength-dependent time delays.

* * * * *